(12) United States Patent
Hu et al.

(10) Patent No.: US 9,529,693 B2
(45) Date of Patent: Dec. 27, 2016

(54) MANAGING SOFTWARE PERFORMANCE TESTS BASED ON A DISTRIBUTED VIRTUAL MACHINE SYSTEM

(71) Applicant: International Business Machines Corporation, Armonk, NY (US)

(72) Inventors: Guoqiang Hu, Shanghai (CN); Qi Cheng Li, Beijing (CN); Jian Wang, Beijing (CN); Yi Min Wang, Shanghai (CN); Bo Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 14/190,208

(22) Filed: Feb. 26, 2014

(65) Prior Publication Data
US 2014/0245069 A1   Aug. 28, 2014

(30) Foreign Application Priority Data
Feb. 28, 2013   (CN) .......................... 2013 1 0064438

(51) Int. Cl.
*G06F 11/00*   (2006.01)
*G06F 11/36*   (2006.01)

(52) U.S. Cl.
CPC .................................. *G06F 11/362* (2013.01)

(58) Field of Classification Search
CPC . G06F 11/362; G06F 11/3688; G06F 11/3676; G06F 11/3684; G06F 11/3636; G06F 11/3664
USPC ........................................................ 714/38.1
See application file for complete search history.

(56) References Cited

U.S. PATENT DOCUMENTS

| | | | |
|---|---|---|---|
| 7,401,324 B1 * | 7/2008 | Dmitriev | G06F 8/443 717/130 |
| 8,271,999 B2 | 9/2012 | Jones et al. | |
| 8,407,525 B2 * | 3/2013 | Vorbach | G06F 9/30036 714/38.1 |

(Continued)

FOREIGN PATENT DOCUMENTS

CN   101042673 A   9/2007

OTHER PUBLICATIONS

"TTL" page of wikipedia, retrieved using the WayBackMachine from Jan. 31, 2013, retrived from: https://web.archive.org/web/20130131193119/http://en.wikipedia.org/wiki/Time_to_live.*

(Continued)

*Primary Examiner* — Yair Leibovich
(74) *Attorney, Agent, or Firm* — Cantor Colburn LLP

(57) ABSTRACT

Managing software performance debugging based on a distributed VM system is provided. In response to determining a debugging state of a software system running on a VM, a timing of a system clock of the VM is controlled. A data packet sent to the VM from another VM is intercepted, and an added system time and reference time that indicate when the packet was sent by the other VM is extracted from the packet. Based on the system and reference times, as well as a reference time of when the packet is intercepted, a timing at which the packet is expected to be received by the VM is calculated. The packet is forwarded to the VM as a function of a comparison of the timing at which the packet is expected to be received and a system time of the VM when the packet is intercepted.

14 Claims, 4 Drawing Sheets

(56) References Cited

U.S. PATENT DOCUMENTS

| | | | | |
|---|---|---|---|---|
| 2004/0030912 | A1* | 2/2004 | Merkle, Jr. | G06F 21/10 |
| | | | | 726/26 |
| 2008/0114806 | A1* | 5/2008 | Kosche | G06F 11/3409 |
| 2010/0305767 | A1* | 12/2010 | Bengtson | F03D 7/047 |
| | | | | 700/287 |
| 2011/0320617 | A1* | 12/2011 | Annamalaisami | H04L 63/1458 |
| | | | | 709/228 |

OTHER PUBLICATIONS

Gupta, D., Vishwanath, K. V., and Vahdat, A. DieCast: Testing distributed systems with an accurate scale model. In NSDI•08 (San Francisco, CA, USA, 2008), USENIX, 15 pages.

Malony et al., "Compensation of Measurement Overhead in Parallel Performance Profiling."; Department of Computer and Inforamtion Science, University of Oregon and Newman Institute for Computing (NIC), Department of Computer Science, Germany, 23 pages.

VMware: "Timekeeping in VMware Virtual Machines" VMware vSphere 5.0, Workstation 8.0, Fusion 4.0, 2011, 32 pages.

Wang, Jian "Survey of State-of-the-art in Inter-VM Communication Mechanisms" Sep. 27, www.cs.binghamton.edu/~jianwang/papers/proficiency.pdf, 2009, 25 pages.

* cited by examiner

MANAGING SOFTWARE PERFORMANCE TESTS BASED ON A DISTRIBUTED VIRTUAL MACHINE SYSTEM

PRIORITY

The present application claims priority to Chinese Patent Application No. 201310064438.1, filed Feb. 28, 2013, and all the benefits accruing therefrom under 35 U.S.C. §119, the contents of which in its entirety are herein incorporated by reference.

BACKGROUND

The present disclosure relates generally to the management of software performance testing, and more specifically, to managing software performance testing based on a distributed virtual machine (VM) system.

Software performance debugging is an important component of software quality control. The process of software debugging enables developers to find potential defects in software implementation or configuration, which can result in system improvements. Software debugging focuses on a series of diagnosis information for reflecting particular software running conditions (for example, the iterative calling sequence of multiple related functions of a complicated function). In order to enable a system under test to generate such diagnosis information, a series of instruments for generating the diagnosis information are embedded into the system under test before running the software, which can increase the program execution overhead.

With more and more powerful functions available, the scale of software products is becoming larger and larger. In general, instead of deploying on a physical machine, large-scale software is usually deployed on multiple physical nodes in a distributed manner. With the evolvement and popularization of VM techniques and cloud computing services, more and more distributed systems are established in distributed virtual environments. A distributed VM system is formed by a series of VM nodes that are widely distributed over physical resources of a network, which are isolated from each other safely and independently. Each VM encapsulates hardware and software resources required by the execution of user applications, and those VM nodes work cooperatively according to a particular relationship to construct a virtual execution environment for the accomplishment of user tasks. Running software in a distributed virtual environment, different function components are generally distributed on VMs on different physical machines. Mutual access or calling on a hierarchical structure may occur at run time, for example, an upper level subtask needs to invoke the execution result of a lower level subtask.

SUMMARY

According to an embodiment, there is provided a method for managing software performance debugging based on a distributed VM system. The method includes, in response to determining a debugging state of a software system running on a VM, controlling timing of a system clock of the VM. In response to intercepting a data packet sent to the VM from another VM, the method includes extracting from the data packet an added system time and a reference time indicative of when the data packet is sent by the other VM. Based on the system time and the reference time of when the data packet is sent by the other VM, and a reference time of when the data packet is intercepted, the method includes calculating a timing at which the data packet is expected to be received by the VM. The method further includes forwarding the data packet to the VM as a function of a comparison result of the timing at which the data packet is expected to be received by the VM and a system time of the VM when the data packet is intercepted.

According to another embodiment, there is provided a system for managing software performance debugging based on a distributed VM system. The system includes a time control module configured to, in response to determining a debugging state of a software system running on a VM, control timing of a system clock of the VM. The system also includes a time extraction module configured to intercept a data packet sent to the VM from another VM, and extract from the data packet an added system time and a reference time indicative of when the data packet is sent by the other VM. The system further includes a time calculation module configured to, based on the system time and the reference time of when the data packet is sent by the other VM, and a reference time of when the data packet is intercepted, calculate a timing at which the data packet is expected to be received by the VM. The system also includes a data packet handling module configured to forward the data packet to the VM as a function of a comparison result of the timing at which the data packet is expected to be received by the VM and a system time of the VM when the data packet is intercepted.

BRIEF DESCRIPTION OF THE SEVERAL VIEWS OF THE DRAWINGS

Through the more detailed description of some embodiments of the present disclosure in the accompanying drawings, the above and other, features of the present disclosure will become more apparent, wherein the same reference generally refers to the same components in the embodiments of the present disclosure.

DETAILED DESCRIPTION

Figure 1:
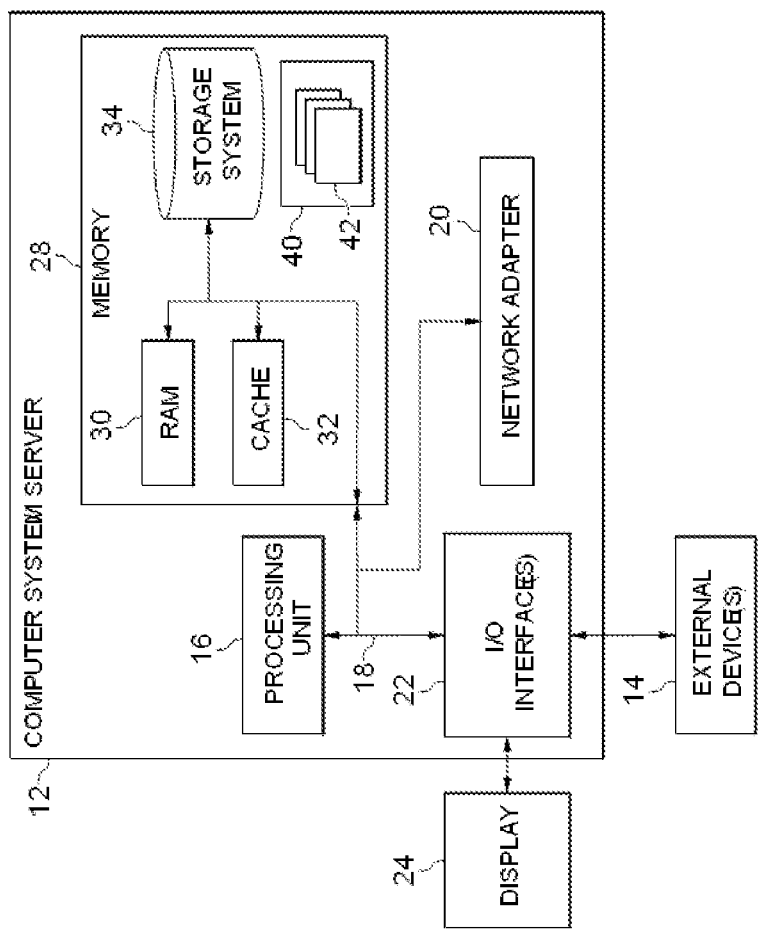
FIG. 1 shows an exemplary computer system according to some embodiments.

Embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, embodiments may be implemented as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for some embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Running software in a distributed virtual environment, different function components are generally distributed on VMs on different physical machines. Mutual access or calling on a hierarchical structure may occur at run time, for example, an upper level subtask needs to invoke the execution result of a lower level subtask. In software performance debugging, because instruments are embedded in software, it may increase the execution time of the lower level subtask, and thereby a delay in the response to a request of the upper level subtask, or even a response failure. This delay may not only affect the success of the software debugging per se, but also make it more challenging to carry out other tasks concurrently and efficiently during the process of software debugging (such as, e.g., software performance testing).

The embodiments described herein provide efficient software debugging techniques for use in a distributed computing environment. According to the method for managing software performance debugging based on a distributed VM system of the embodiments described herein, by controlling system time for the VMs running on various nodes to eliminate the interference of the debugging instruments on system execution time, other tasks can be executed concurrently and efficiently during the process of software performance debugging without being affected by software performance debugging.

Referring now to FIG. 1, an exemplary computer system/server 12 which is applicable to implement the embodiments described herein is shown. Computer system/server 12 is only illustrative and is not intended to suggest any limitation as to the scope of use or functionality of embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
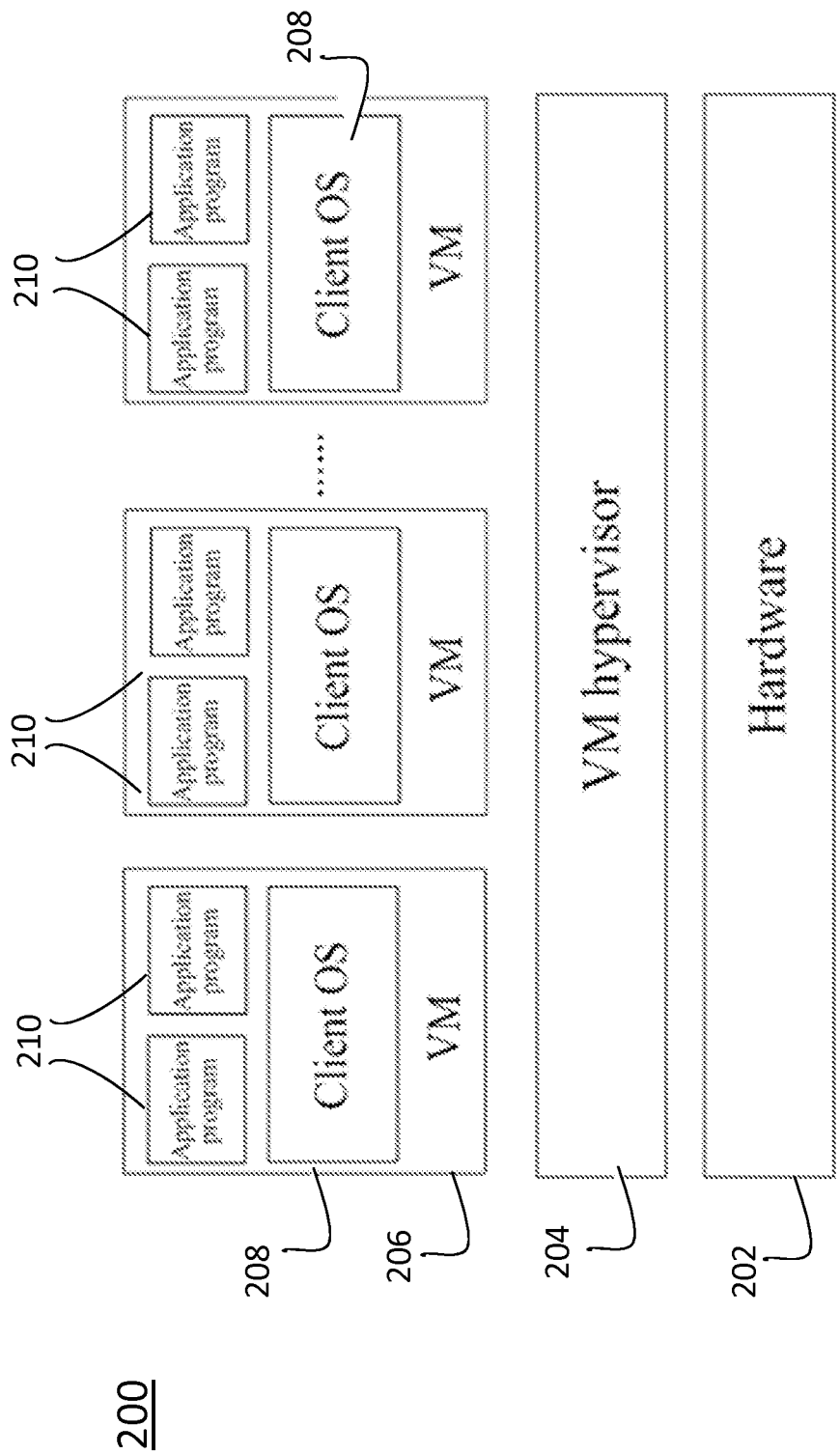
FIG. 2 shows a schematic diagram of an individual node in a virtualized system according to some embodiments.

FIG. 2 shows a schematic diagram of an individual node 200 in a virtualized system according to an embodiment. The individual node comprises a physical machine (e.g., hardware) 202, a hypervisor (VM hypervisor) 204, and multiple virtual machines (VMs) 206, wherein a VM is a tightly isolated software container, which may comprise multiple guest operation systems (OSs) 208 (e.g., client OS) and a bundle of applications 210 running on each of those guest OSs. Several VMs having different OSs may run on the same physical machine separately to realize resource sharing among multiple VMs on a single physical machine. VM hypervisor is a software layer for providing underlying machine virtualization, which runs on physical hardware to manage and provide support for VMs at an underlying level, so as to dynamically and transparently allocate hardware resources to the VMs. According to some embodiments, the VMs may operate in the Java virtual machine (JVM) operation environment defined by the Java standard specification, or any other platform-independent VMs, such as C#, Smalltalk, Ruby, D language, and nuva, but not limited to Java.

Figure 3:
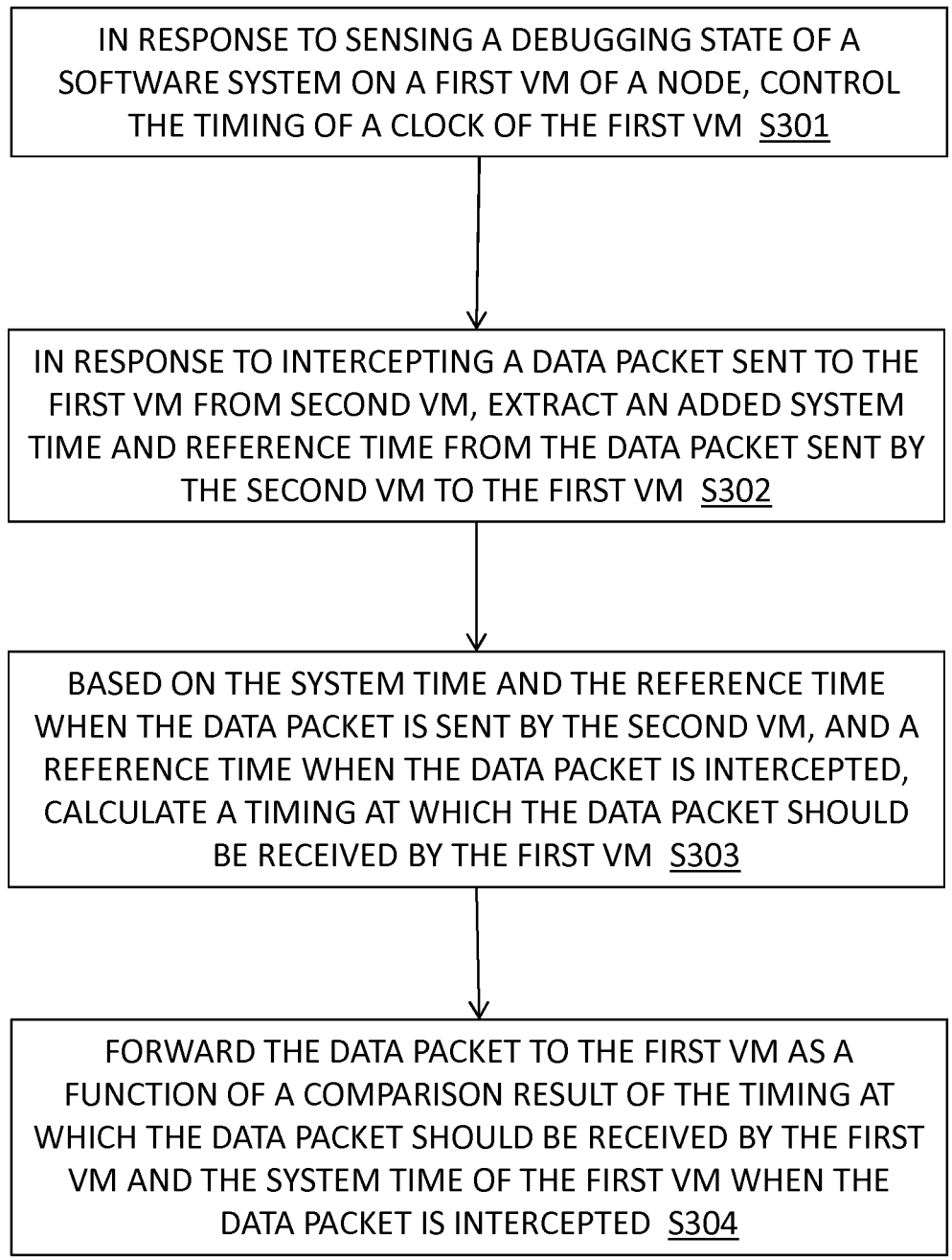
FIG. 3 shows a method for managing software performance debugging based on a distributed VM system according to some embodiments.

FIG. 3 shows a method for managing software performance debugging based on a distributed VM system according to an embodiment. The distributed VM system comprises multiple nodes, each comprising a VM hypervisor and at least one VM. The management method may be executed by the VM hypervisor of each node, wherein the VMs running on each node cooperate with the VM hypervisor, comprising: at step S301, in response to sensing a debugging state of a software system running on a present VM (also referred to as "VM"), controlling the system time of the VM; at step S302, in response to intercepting a data packet sent to the VM from another VM, extracting from the data packet an added system time and an added reference time that indicate when the data packet is sent by the other VM; at step S303, based on the system time and the reference time when the data packet is sent out by the other VM, and also based on a reference time when the data packet is intercepted, calculating a timing at which the data packet is expected to be received by the VM; at step S304, determining whether to forward the data packet to the VM as a function of a comparison result of the timing at which the data packet is expected to be received by the VM and a system time of the VM when the data packet is intercepted.

As indicated above, at step S301, in response to sensing the debugging state of the software system running on the VM, the system time of the VM is controlled. In particular, in response to receiving a notification about an upcoming execution of debugging instruments issued from the software system on the VM, the timing of the system clock of the VM is suspended; and in response to receiving a notification about the completion of the debugging instrument execution issued by the software system on the VM, the timing of the system clock of the VM is resumed. Herein, the other VM may be deployed on the same node with the VM, or may be deployed on different nodes with the VM.

Figure 4:
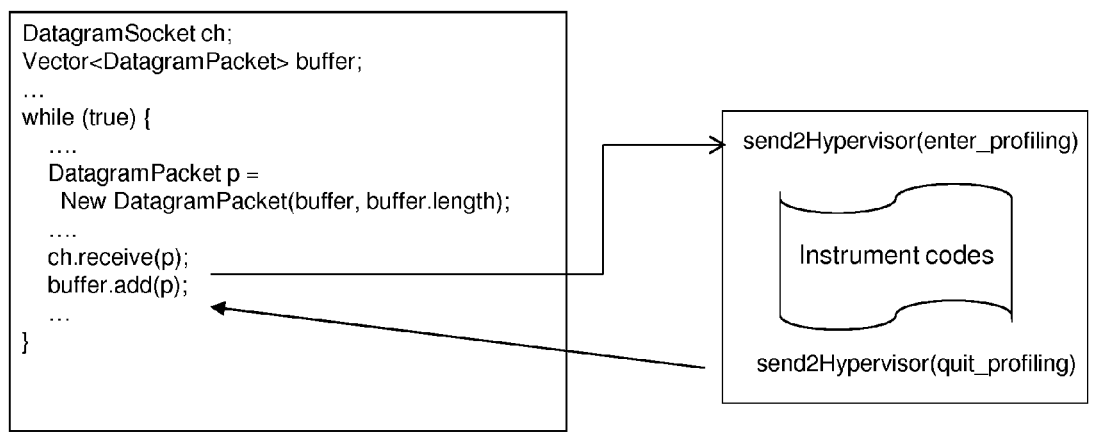
FIG. 4 shows an example of I/O performance debugging performed for a software system on a virtual machine according to some embodiments.

FIG. 4 shows an example of I/O performance debugging performed for a software system on a VM. Debugging instruments are triggered to execute when a function ch.receive (p) is reached during the execution of the software code. According to the embodiment, a notification mechanism is provided for code debugging between the VM of the present node and the VM hypervisor. Particularly, a function send2Hypervisor( ) is used to notify the execution situation of the debugging instruments from the VM to the VM hypervisor. Particularly, before the execution of the debugging instruments, the software system invokes a function send2Hypervisor (enter_profiling) to notify the VM hypervisor of the upcoming execution of the debugging instruments; after the completion of the execution of the debugging instruments, the software system invokes a function send2Hypervisor (quit_profiling) to notify the VM hypervisor of the completion of the execution of the debugging instruments and, meanwhile, the procedure returns to the function ch.receive (p) and continues with instruments following the function ch.receive (p). After the VM hypervisor receives the notification about the completion of the execution of the debugging instruments sent from the function send2Hypervisor( ), the timing of the system clock is resumed.

At step S302, in response to intercepting the data packet sent to the VM from the other VM, the added system time and reference time indicating when the data packet is sent by the other VM are extracted from the data packet. Particularly, the data packet sent from the other VM to the VM is, at first, intercepted by the other VM hypervisor, which may parse the address of the other VM from the head of the data packet, to obtain a system time when the data packet is sent by the other VM and add two time tags in the head, representing the reference time and the system time when the data packet is sent by the other VM respectively. According to an embodiment, the time tags can be added in an optional field in the head, and the data packet with the time tags added is then forwarded to the VM. Note that, various nodes in a distributed VM system have a consistent reference time.

The data packet sent from the other VM (i.e., the source VM) to the VM (the destination VM) is intercepted by the present VM hypervisor, and a source address of the source VM address_svm, a destination address of the destination VM address_dvm, the reference time t_swc, and the system time t_svm added at the source VM side when the data packet is sent by the source VM are parsed from the head of the data packet.

The present VM hypervisor is also used to intercept a data packet sent from the VM to other VM, parse, at first, the address of the VM from the data packet sent to the other VM by the VM, obtain a system time and a reference time when the data packet is sent by the VM according to the address of the VM, and then add the system time and the reference time when the data packet is sent by the VM in the data packet.

At step S303, according to the system time when the data packet is sent by the other VM, the reference time when the data packet is sent and a reference time when the data packet is intercepted, a timing at which the data packet should be received by the VM is calculated. Particularly, the timing at which the data packet should be received by the VM is calculated as follows:

$$t'=t_{svm}+(t_{dwc}-t_{swc}),$$

wherein t_dwc is the reference time when the data packet is intercepted.

The received data packet is saved in the buffer of the VM hypervisor, and the absolute value of the difference between $t^1$ and the system time of the destination VM t_dvm is compared with a time precision threshold d, and according to the result of the comparison, different processes may be performed. Herein, d can be set to, e.g., 1 ms, depending on practical conditions.

At step S304, according to the comparison result of the timing at which the data packet is expected to be received by the VM and the system time of the VM when the data packet is intercepted, it is determined whether to forward the data packet to the VM. Herein and hereinafter, a timing larger than another one indicates a timing later than the other one.

According to an embodiment:

If |t'−t_l.dstVM|<=d, it indicates that the data packet should be handled immediately. The VM hypervisor forwards the data packet to the destination VM immediately.

If t'>t_l.dstVM+d, it indicates that the data packet should be handled at a later time. The VM hypervisor buffers the data packet in a queue, and forwards the data packet to the destination VM until the system time of the VM is equal to $t^1$, i.e., t_l.dstVM=t'

If t'<t_l.dstVM−d, it indicates that data packet arrives too late. The VM hypervisor discards the data packet directly.

Because suspending or resuming system time of a VM may cause inconsistent system times of different VMs, and thus may cause timing disorder of operations between VMs, handling the data packet according to the above logic may prevent the occurrence of timing disorder.

Further, a list is established in the memory of the VM hypervisor for the buffered queue of data packets sent from source VMs to destination VMs, in which source VM addresses, destination VM addresses and the number of data packets waiting to be processed that are sent from a source VM to a destination VM are recorded. Table 1 shows an example of the list of the buffered queue.

TABLE 1

| Source VM address | Destination VM address | Number of data packets in the buffered queue |
|---|---|---|
| Address_svm1 | Address_dvm1 | 1 |
| Address_svm2 | Address_dvm2 | 2 |

According to an embodiment, when the VM is a source VM, and the software system of the VM invokes a connection-oriented function send( ) to perform the operation of sending a data packet, the VM sends a notification to the VM hypervisor, in response to sensing the operation of sending a data packet to other VM by the VM in a connection-oriented manner (for example, a transmission based on the TCP protocol), the data packet sent to the other VM is intercepted; an address and a port number of the source VM and an address and a port number of the destination VM are parsed from the head of the intercepted data packet, at the same time, two time tags are added in the head of the intercepted data packet, i.e., a system time and a reference time of the source VM at the current moment, after which the data packet with the time tags added is forwarded to the destination VM; then the running of the VM is suspended; after the source VM sends a data packet to the destination VM in a connection-oriented manner, an acknowledgment received from the destination VM is required for the continuous execution of subsequent operations; the list for the buffered queue of data packets is queried and matched using the address and port number of the source/destination VM; once a matching data packet is found, that is, in response to finding a data packet for which an acknowledgment sent from other VM has been received, a timing $t^1$ at which the acknowledged data packet should be received by the VM is obtained; as described in step S302 and S303 above, for each intercepted data packet, the VM hypervisor extracts the added system time and the reference time when the data packet is sent by the other VM; according to the system and the reference time of the other VM when the data packet is sent and a reference time when the data packet is intercepted, a timing $t^1$ at which the data packet should be received by the VM is calculated; in response to confirming that the timing $t^1$ at which the received data packet should be received by the VM is larger than the current system time of the VM, the running of the VM is resumed.

According to an embodiment, when the VM is a destination VM, and its software system invokes the function receive( ) to perform the operation of receiving the data packet in the non-blocking mode, the destination VM sends a notification to the VM hypervisor. After receiving the notification, the VM hypervisor performs a step of controlling the VM to suspend/resume its execution.

According to an embodiment, in response to sensing the operation of receiving a data packet from other VM by the VM in the non-blocking mode, the running of the VM is suspended; for each of the other VMs that may send data packets to the VM, the operation of the VN is resumed if one of the following conditions is met:

(1) the other VM that may send a data packet to the VM has at least one data packet in the buffered queue, and the timing at which the data packet should be received by the VM is larger than or equal to the current system time of the VM;

(2) it is determined through querying that the system time of the other VM sending the data packet to the VM is larger than or equal to the system time of the VM.

Herein, the other VM that may send the data packet to the VM may be a predetermined VM, or any other VMs except the VM.

According to an embodiment, when the VM is a destination VM, and its software system invokes the function receive( ) to perform the operation of receiving a data packet in the blocking mode, the destination VM sends a notification to the VM hypervisor. In the blocking mode, the process waits until the data packet is received, in which a timeout timing is generally set and the process is unblocked to continue its execution after timeout. After receiving the notification, the VM hypervisor control the VM to suspend/resume its execution through the following manner.

According to an embodiment, in response to sensing the operation of receiving a data packet by the VM from other VM in the blocking mode, the running of the VM is suspended; for each of the other VMs that may send data packets to the VM, the running of the VM is resumed if one of the following conditions is met.

(1) the other VM that may send a data packet to the VM has at least one data packet in the buffered queue, and the timing at which the data packet should be received by the VM is larger than or equal to the timeout timing for resuming reception in the blocking mode;

(2) it is determined through querying that the system time of the other VM sending the data packet to the VM is larger than or equal to the timeout timing for resuming reception in the blocking mode.

According to another embodiment, in response to sensing the operation of receiving a data packet by the VM in the blocking mode from the other VM, the running of the VM is suspended; for each of the other VMs that may send data packets to the VM, the running of the VM is resumed if one of the following conditions is met.

(1) the other VM that may send a data packet to the VM has at least one data packet in the buffered queue, and the timing at which the data packet should be received by the VM is larger than or equal to a timing T, wherein the timing T is larger than the timing at which the data packet should be received by the VM and less than the timeout timing for resuming reception in the block mode;

(2) it is determined through querying that the system time of the other VM sending the data packet to the VM is larger than or equal to the timing T.

Through scheduling the suspension/running of various VMs, it is ensured that data communication between VMs is consistent in terms of timing with the case in which no control on VM system time is provided, and thereby the reality of the operation of the whole distributed system is guaranteed.

Figure 5:
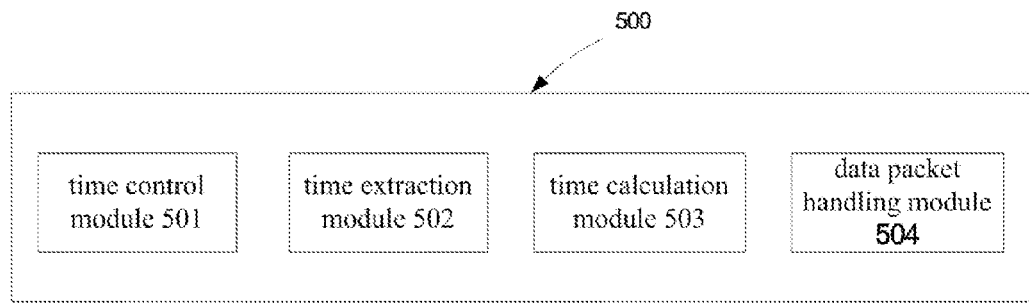
FIG. 5 shows a system for managing software performance debugging based on a distributed VM system according to some embodiments.

Based on the same inventive concept, a system for managing software performance debugging based on a distributed VM system is further provided. FIG. 5 shows a system 500 for managing software performance debugging based on a distributed VM system according to an embodiment, comprising: a time control module 501, configured to, in response to sensing a debugging state of a software system running on a VM, control system time of the VM; a time extraction module 502, configured to, in response to intercepting a data packet sent to the VM from other VM, extract an added system time and reference time when the data packet is sent by the other VM from the data packet sent to the VM; a time calculation module 503, configured to, according to the system time and the reference time when the data packet is sent by the other VM, a reference time when the data packet is intercepted, calculate a timing at which the data packet should be received by the VM; a data packet handling module 504, configured to, according to the comparison result of the timing at which the data packet should be received by the VM and the system time of the VM when the data packet is intercepted, determine whether to forward the data packet to the VM. Herein, the modules 501-504 correspond to the steps 301-304 of the method shown in FIG. 3, which will not be repeated herein.

According to an embodiment, the time control module is configured to, in response to receiving a notification about an upcoming execution of debugging instruments issued from the software system on the VM, suspend the timing of the system clock of the VM; and in response to receiving a notification about the completion of the execution of the debugging instruments issued by the software system on the VM, resume the timing of the system clock of the VM.

According to an embodiment, the data packet handling module 504 comprises: a data packet forwarding module, configured to, in response to the absolute value of the difference between the timing at which the data packet should be received by the VM and the system time of the VM when the data packet is intercepted that is less than or equal to a predetermined time precision threshold, forward the data packet to the VM immediately; a data packet buffering module, configured to, in response to the difference between the timing at which the data packet should be received by the VM and the system time of the VM when the data packet is intercepted that is larger than the predetermined time precision threshold, buffering the data packet in a data packet buffered queue until the system time of the VM is equal to the timing at which the data packet should be received by the VM, in which case the data packet is forwarded to the VM; a data packet discarding module, configured to, in response to the difference between the timing at which the data packet should be received by the VM and the system time of the VM when the data packet is intercepted that is larger than the predetermined time precision threshold, discard the data packet.

According to an embodiment, the management system 500 further comprises: a parsing module, configured to in response to intercepting a data packet sent from the VM to the other VM, parse the address of the VM from the data packet sent to the other VM from the VM; a time obtaining module, configured to obtain a system time and a reference time of the VM when the data packet is sent according to the address of the VM; a time adding module, configured to add the system time and the reference time of the VM when the data packet is sent to the data packet sent to the other VM from the VM.

According to an embodiment, the management system 500 further comprises: an interception module, a VM suspension module, and a VM running module, wherein the interception module is configured to in response to sensing the operation of sending a data packet to other VM by the VM in a connection-oriented mode, intercept the data packet sent to the other VM from the VM; the VM suspension module is configured to suspend the running of the VM; the time obtaining module is configured to, in response to finding a data packet of acknowledgement of receipt sent from the other VM in the data packet buffered queue, obtain a timing at which the data packet of acknowledgement of receipt should be received by the VM; the VM running module is configured to, in response to the timing at which the data packet of acknowledgement of receipt should be received by the VM being larger than the current system time of the VM, resume the running of the VM.

According to an embodiment, the VM suspension module is further configured to in response to sensing the operation of receiving a data packet in the non-blocking mode from other VM by the VM, suspend the running of the VM; the VM running module is configured to resume the running of the VM if one of the following conditions is met for each of the other VMs that may send data packets to the VM:

(1) the other VM that may send a data packet to the VM has at least one data packet in the buffered queue, and the timing at which the data packet should be received by the VM is larger than or equal to the current system time of the VM;

(2) it is determined through querying that the system time of the other VM sending the data packet to the VM is larger than or equal to the system time of the VM.

According to an embodiment, the VM suspension module is further configured to in response to sensing the operation of receiving a data packet in the blocking mode from other VM by the VM, suspend the running of the VM; the VM running module is configured to resume the running of the VM if one of the following conditions is met for each of the other VMs that may send data packets to the VM:

(1) the other VM that may send a data packet to the VM has at least one data packet in the buffered queue, and the timing at which the data packet should be received by the VM is larger than or equal to the timeout timing for resuming reception in the blocking mode;

(2) it is determined through querying that the system time of the other VM sending the data packet to the VM is larger than or equal to the timeout timing for resuming reception in the blocking mode.

According to an embodiment, the VM suspension module is further configured to in response to sensing the operation of receiving a data packet in the blocking mode from other VM by the VM, suspend the running of the VM; the VM running module is configured to resume the running of the VM if one of the following conditions is met for each of the other VMs that may send data packets to the VM:

(1) the other VM that may send a data packet to the VM has at least one data packet in the buffered queue, and the timing at which the data packet should be received by the VM is larger than or equal to a timing T, wherein the timing T is larger than the timing at which the data packet should be received by the VM and less than the timeout timing for resuming reception in the block mode;

(2) it is determined through querying that the system time of the other VM sending the data packet to the VM is larger than or equal to the timing T.

Reference can be made to the particular method above for the details of the above modules, which will not be repeated herein.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   in response to determining a debugging state of a software system running on a virtual machine (VM), controlling timing of a system clock of the VM;
   intercepting a data packet sent to the VM from another VM, and extracting from the data packet an added system time and a reference time indicative of when the data packet is sent by the other VM;
   based on the system time and the reference time of when the data packet is sent out by the other VM and a reference time of when the data packet is intercepted, calculating a timing at which the data packet is expected to be received by the VM; and
   forwarding the data packet to the VM as a function of a comparison result of the timing at which the data packet is expected to be received by the VM and a system time of the VM when the data packet is intercepted;
   wherein in response to determining the debugging state of the software system running on the VM, controlling the timing of the system clock of the VM comprises:
   in response to receiving a notification of an upcoming execution of debugging instruments issued from the software system on the VM, suspending the timing of the system clock of the VM; and
   in response to receiving a notification of completion of the execution of the debugging instruments issued by the software system on the VM, resuming the timing of the system clock of the VM.

2. The method according to claim 1, wherein forwarding the data packet to the VM as a function of the comparison result comprises:
   in response to the absolute value of the difference between the timing at which the data packet is expected to be received by the VM and the system time of the VM when the data packet is intercepted that is less than or equal to a predetermined time precision threshold, forwarding the data packet to the VM immediately;

in response to the difference between the timing at which the data packet is expected to be received by the VM and the system time of the VM when the data packet is intercepted being larger than the predetermined time precision threshold, buffering the data packet in a data packet buffered queue until the system time of the VM is equal to the timing at which the data packet is expected to be received by the VM, forwarding the data packet to the VM; and in response to the difference between the timing at which the data packet is expected to be received by the VM and the system time of the VM when the data packet is intercepted being larger than the predetermined time precision threshold, discarding the data packet.

3. The method according to claim 2, further comprising:
in response to sensing an operation of sending a data packet to the other VM by the VM in a connection-oriented mode, intercepting the data packet sent to the other VM from the VM;
suspending the running of the VM;
in response to finding a data packet of acknowledgement of receipt that is sent from the other VM in the data packet buffered queue, obtaining a timing at which the data packet of acknowledgement of receipt is expected to be received by the VM; and
in response to the timing at which the data packet of acknowledgement of receipt is expected to be received by the VM being larger than the current system time of the VM, resuming the running of the VM.

4. The method according to claim 2, further comprising:
in response to sensing operation of receiving a data packet in a non-blocking mode from the other VM by the VM, suspending the running of the VM; and
resuming the running of the VM if one of a plurality of conditions is met for each of other VMs that send data packets to the VM, the plurality of conditions comprising:
(1) the other VM that sends a data packet to the VM buffer at least one data packet in the buffered queue, and the timing at which the data packet is expected to be received by the VM is larger than or equal to the current system time of the VM; and
(2) it is determined through querying that the system time of the other VM sending the data packet to the VM is larger than or equal to the system time of the VM.

5. The method according to claim 2, further comprising:
in response to sensing an operation of receiving a data packet in a blocking mode from the other VM by the VM, suspending the running of the VM; and
resuming the running of the VM if one of a plurality of conditions is met for each of other VMs that send data packets to the VM, the plurality of conditions comprising:
(1) the other VM that sends a data packet to the VM buffers at least one data packet in the buffered queue, and the timing at which the data packet is expected to be received by the VM is larger than or equal to the timeout timing for resuming reception in the blocking mode; and
(2) it is determined through querying that the system time of the other VM sending the data packet to the VM is larger than or equal to the timeout timing for resuming reception in the blocking mode.

6. The method according to claim 2, further comprising:
in response to sensing an operation of receiving a data packet in a blocking mode from the other VM by the VM, suspending the running of the VM; and
resuming the running of the VM if one of a plurality of conditions is met for each of other VMs that send data packets to the VM, the plurality of conditions comprising:
(1) the other VM that sends a data packet to the VM has at least one data packet in the buffered queue, and the timing at which the data packet is expected to be received by the VM is larger than or equal to a timing T, wherein the timing T is larger than the system time of the VM and less than the timeout timing for resuming reception in the blocking mode; and
(2) it is determined through querying that the system time of that the other VM sending the data packet to the VM is larger than or equal to the timing T.

7. The method according to claim 1, further comprising:
in response to intercepting a data packet sent from the VM to the other VM, parsing an address of the VM from the data packet sent to the other VM from the VM;
obtaining a system time and a reference time of the VM when sending the data packet to the other VM according to the address of the VM; and
adding the system time and the reference time of the VM when sending the data packet to the other VM in the data packet sent to the other VM from the VM.

8. A system, comprising:
a memory having computer readable instructions; and
a processor for executing the computer readable instructions, the computer readable instructions, when executed by the processor, cause the processor to perform actions including:
in response to determining a debugging state of a software system running on a virtual machine (VM), controlling timing of a system clock of the VM;
intercepting a data packet sent to the VM from another VM, and extracting from the data packet added system time and a reference time indicative of when the data packet is sent by the other VM;
based on the system time and the reference time of when the data packet is sent by the other VM, and a reference time of when the data packet is intercepted, calculating a timing at which the data packet is expected to be received by the VM; and
forwarding the data packet to the VM as a function of a comparison result of the timing at which the data packet is expected to be received by the VM and a system time of the VM when the data packet is intercepted;
wherein in response to receiving a notification of an upcoming execution of debugging instruments issued from the software system on the VM, suspending the timing of the system clock of the VM; and
in response to receiving a notification of the completion of the execution of the debugging instruments issued by the software system on the VM, resuming the timing of the system clock of the VM.

9. The system according to claim 8, wherein the computer readable instructions include:
in response to the absolute value of the difference between the timing at which the data packet is expected to be received by the VM and the system time of the VM when the data packet is intercepted being less than or equal to a predetermined time precision threshold, forwarding the data packet to the VM immediately;

in response to the difference between the timing at which the data packet is expected to be received by the VM and the system time of the VM when the data packet is intercepted being larger than the predetermined time precision threshold, buffering the data packet in a data packet buffered queue until the system time of the VM is equal to the timing at which the data packet is expected to be received by the VM, and forwarding the data packet to the VM; and in response to the difference between the timing at which the data packet is expected to be received by the VM and the system time of the VM when the data packet is intercepted that being larger than the predetermined time precision threshold, discarding the data packet.

10. The system according to claim 9, wherein the computer readable instructions include:
   in response to sensing an operation of sending a data packet to the other VM by the VM in a connection-oriented mode, intercepting the data packet sent to the other VM from the VM; suspending the running of the VM; in response to finding a data packet of an acknowledgement of receipt that is sent from the other VM in the data packet buffered queue, obtaining a timing at which the received data packet is expected to be received by the VM; and in response to the timing at which the data packet of an acknowledgement of receipt is expected to be received by the VM being larger than the current system time of the VM, resuming the running of the VM.

11. The system according to claim 9, wherein the computer readable instructions include:
   in response to sensing an operation of receiving a data packet in a non-blocking mode from the other VM by the VM, suspending the running of the VM; and
   resuming the running of the VM if one of a plurality of conditions is met, for each of other VMs that send data packets to the VM, the plurality of conditions comprising:
   (1) the other VM that sends a data packet to the VM buffers at least one data packet in the buffered queue, and the timing at which the data packet is expected to be received by the VM is larger than or equal to the current system time of the VM; and
   (2) it is determined through querying that the system time of the other VM that sends the data packet to the VM is larger than or equal to the system time of the VM.

12. The system according to claim 9, wherein the computer readable instructions include:
   in response to sensing an operation of receiving a data packet in a blocking mode from the other VM by the VM, suspending the running of the VM; and
   resuming the running of the VM if one of a plurality of conditions is met for each of other VMs that sends data packets to the VM, the plurality of conditions comprising:
   (1) the other VM that sends a data packet to the VM buffers at least one data packet in the buffered queue, and the timing at which the data packet is expected to be received by the VM is larger than or equal to the timeout timing for resuming reception in the blocking mode; and
   (2) it is determined through querying that the system time of the other VM that sends the data packet to the VM is larger than or equal to the timeout timing for resuming reception in the blocking mode.

13. The system according to claim 9, wherein the computer readable instructions include:
   in response to sensing an operation of receiving a data packet in a blocking mode from the other VM by the VM, suspending the running of the VM; and
   resuming the running of the VM if one of a plurality of conditions is met for each of the other VMs that sends data packets to the VM, the plurality of conditions comprising:
   (1) the other VM that sends a data packet to the VM buffers at least one data packet in the buffered queue, and the timing at which the data packet is expected to be received by the VM is larger than or equal to a timing T, wherein the timing T is larger than the system time of the VM but less than the timeout timing for resuming reception in the blocking mode; and
   (2) it is determined through querying that the system time of the other VM that may send the data packet to the VM is larger than or equal to the timing T.

14. The system according to claim 8, wherein the computer readable instructions include:
   in response to intercepting a data packet sent from the VM to the other VM, parsing an address of the VM from the data packet sent to the other VM from the VM;
   obtaining a system time and a reference time of the VM when sending the data packet according to the address of the VM; and
   adding the system time and the reference time of the VM when sending the data packet to the other VM to the data packet sent to the other VM from the VM.

* * * * *